March 16, 1926. 1,576,768

W. P. LOUDON

VOLTAGE REGULATOR SYSTEM

Filed Sept. 12, 1921    2 Sheets-Sheet 1

WITNESSES:

INVENTOR
Warren P. Loudon.
BY
ATTORNEY

March 16, 1926.　　　W. P. LOUDON　　　1,576,768

VOLTAGE REGULATOR SYSTEM

Filed Sept. 12, 1921　　2 Sheets-Sheet 2

WITNESSES:
J. T. Wurmb
M. Theodore Simmons

INVENTOR
Warren P. Loudon.
BY Wesley G. Carr
ATTORNEY

Patented Mar. 16, 1926.

1,576,768

UNITED STATES PATENT OFFICE.

WARREN P. LOUDON, OF WILKINSBURG, PENNSYLVANIA, ASSIGNOR TO WESTINGHOUSE ELECTRIC & MANUFACTURING COMPANY, A CORPORATION OF PENNSYLVANIA.

VOLTAGE-REGULATOR SYSTEM.

Application filed September 12, 1921. Serial No. 500,247.

*To all whom it may concern:*

Be it known that I, WARREN P. LOUDON, a citizen of the United States, and a resident of Wilkinsburg, in the county of Allegheny and State of Pennsylvania, have invented a new and useful Improvement in Voltage-Regulator Systems, of which the following is a specification.

The present invention relates to regulator systems and it has special relation to a regulator adapted to maintain a substantially constant voltage upon a load circuit.

One object of my invention is to provide a regulator of the above-indicated character which shall be simple and inexpensive in construction, and reliable and efficient in operation.

Another object of my invention is to provide a regulator of the above-indicated character which shall include a plurality of coils, the circuit to one of said coils being controlled by one of the electromagnets, and the various elements of said electromagnets being assembled in substantially the same plane.

A further object of my invention is to provide a regulator of the above-indicated character which shall comprise means adapted to prevent freezing action between the operating parts thereof.

A still further object of my invention is to provide a regulator of the above-indicated character which shall have a compensating coil concentrated adjacent to the armature with which it co-operates.

Reference may now be had to the accompanying drawings, in which—

The herein-described regulator is particularly adapted for automobile-lighting and storage-battery systems, and similar uses. Such systems usually comprise a generator, driven by the automobile engine, which supplies current to a storage battery and the lamps of the automobile. Since the speed of the generator is necessarily variable, it is desirable to provide a regulator to control the voltage output of the generator, and also means to open the circuit from the generator to the storage battery whenever necessary to prevent improper discharge of the battery. Since systems of this character are well known, it is deemed necessary to show herein only the regulator and the associated switching means.

Figure 4:
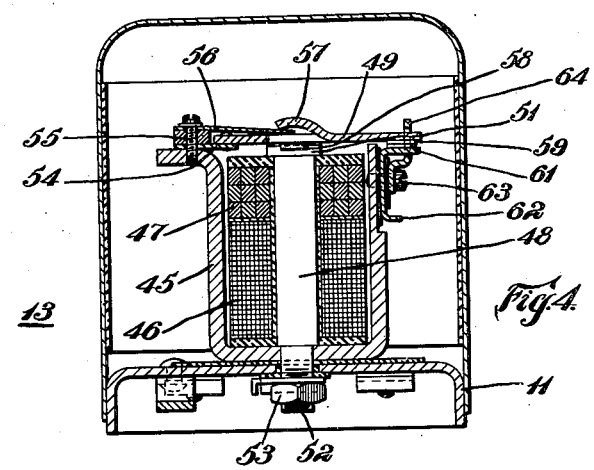
Fig. 4 is a vertical section on the line IV—IV of Fig. 1.
Figure 5:
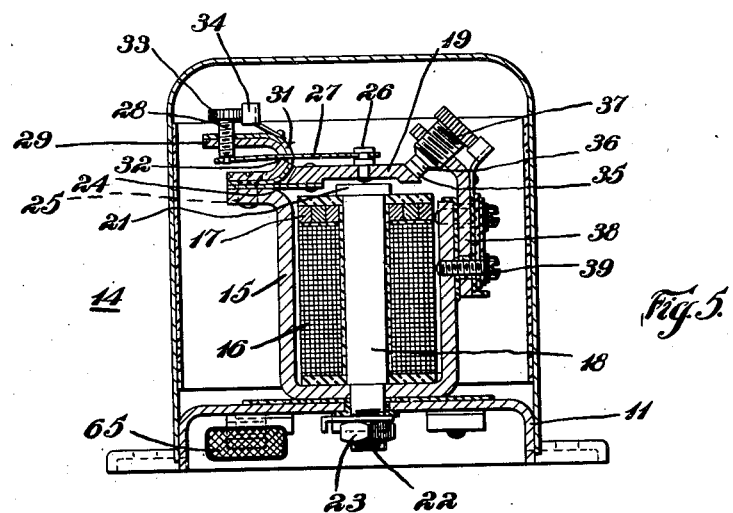
Fig. 5 is a vertical section on the line V—V of Fig. 1.
Figure 6:
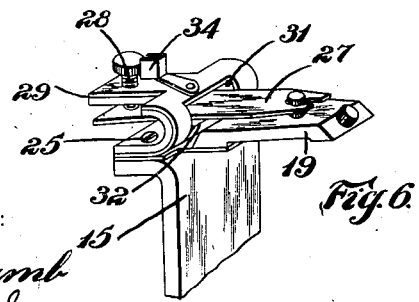
Fig. 6 is an enlarged detail view of the temperature-compensation means.

Referring to the drawings, the regulator unit comprises a base 11 having contact terminals 12, to which the circuit connections are made to the generator and storage battery, and two electromagnetic devices 13 and 14, respectively shown in detail in Figs. 4 and 5, mounted upon the base 11. The device 13 constitutes a "cut-out" or switching means for disconnecting the generator from the charging or load circuit.

The device 14 is a regulator of the vibratory type and comprises a yoke 15 the opposite legs of which terminate in substantially the same plane. Within the yoke 15 is an electromagnet comprising a shunt energizing coil 16, a series of compensating coils 17; a magnetizable core 18 and a movable armature 19. It will be noted that the coils 16 and 17 are arranged end-to-end and that the series compensating coil is concentrated in proximity to the armature 19. The core 18 has a head 21 at the end adjacent to the armature 19 and is screw-threaded at its lower end, as indicated at 22, to receive a nut 23, thus constituting a bolt for securing the electromagnet and the yoke 15 to the base 11.

The armature 19 has secured thereto a flexible hinge 24 which, in turn, is secured to one leg of the yoke 15 by means of screws 25. Mounted within the armature 19 is a nonmagnetic stud 26 which protrudes through the armature 19 to engage the head 21 of the core 18 whenever the armature is actuated unduly. Accordingly, the possibility of freeing action between the core and the armature is avoided.

Engaging the stud 26 is a flat spring 27, having a screw 28 co-operating with the opposite end thereof which is adjustable within the substantially U-shaped bimetallic element 29. Element 29 is slotted, as indicated at 31, and the tension spring 27 extends through the slot 31, pivoting upon the element 29, as indicated at 32 in Fig. 5, so that the bimetallic element 29 becomes a fulcrum for the spring 27. The screw 28 has a spring stop 34 co-operating with the head 33 thereof to prevent accidental movement of the screw 28.

A movable contact member 35 is mounted in an inclined plane upon the armature 19 and co-operates with a normally stationary contact member 36 which is mounted upon a screw 37. The screw 37 is carried by a support 38 secured to one leg of the yoke 15 by means of screws 39, as indicated.

The normal action of the spring 27 is to tend to maintain the contact members 35 and 36 closed. The pull of the coils 16 and 17 must overcome the action of the spring 27, and the initial tension of the spring 27 is adjusted by means of the screw 28. Accordingly, when the armature is attracted downwardly, the spring 2 is put under additional tension. However, if the coils become so heated as to change the resistance thereof, it is desirable that the armature shall respond to a lesser pull than normally. By mounting the adjusting screw 28 in the bimetallic element 29, the tension upon the spring 27 is gradually lessened directly proportional to the temperature increase, thereby permitting the armature 19 to be actuated by the decreased magnetic pull of the weakened coil.

The automatic switching device 13 comprises a yoke 45, the opposite legs of which terminate substantially in the same plane. Within the yoke 45 is an electromagnet comprising a shunt energizing coil 46, a series coil 47, a magnetizable core 48 and a co-operating armature 49. Armature 49 substantially bridges the gap between the opposite legs of the yoke 45. The core 48 has an enlarged head 51 adjacent to the armature 49 and extends through the base 11 of the casing where it is screw-threaded, as indicated at 52, to receive a nut 53, whereby the electromagnet and the yoke 45 are secured to the base 11. The coils 46 and 47 are disposed end-to-end, with the series winding concentrated beneath the armature 49 to prevent leakage flux therein.

The armature 49 has a flexible hinge 54 secured thereto which is fastened to one leg of the yoke 45 by means of screws 55. Screws 55 also secure a spring 56 to the yoke 45 which engages a portion 57 of the armature to retain the free end of the spring 56. Accordingly, whenever the armature is actuated, the spring 56 is put under tension which tends to return it to normal position. Located in the head 51 of the core 48 is a non-magnetic stud 58 which projects between the armature 49 and the core 48, thereby preventing freezing action between the core 48 and the armature 49.

The armature 49 has a contact member 59 mounted thereupon which co-operates with a contact member 61. Contact member 61 is mounted upon a support 62 secured to the opposite leg of the yoke 45 by means of screws 63. A flexible stop 64 co-operates with the armature 49 to limit the movement thereof. Stop 64 may be adjusted by bending the top thereof to either the right or left in Fig. 4.

From the drawings, it will be noted that the operating elements of both the devices 13 and 14 are assembled substantially in the same plane, and also that the respective elements of the two units are located substantially in the same plane. This is of particular advantage in manufacturing since it permits of rapid but accurate assembly without requiring the services of skilled machinists.

Figure 1:
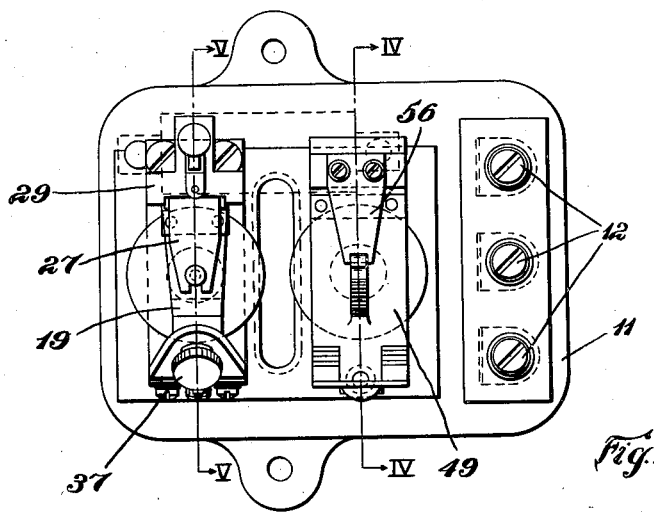
Figure 1 is a top plan view of a regulating unit embodying the principles of the present invention.
Figure 2:
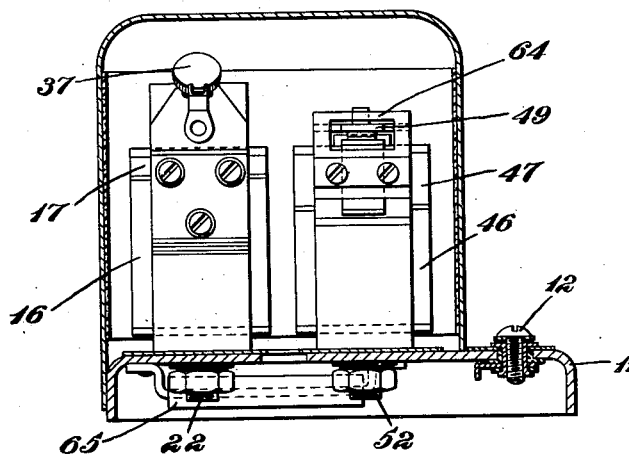
Fig. 2 is a side elevation, partly in section, of the regulating unit.
Figure 3:
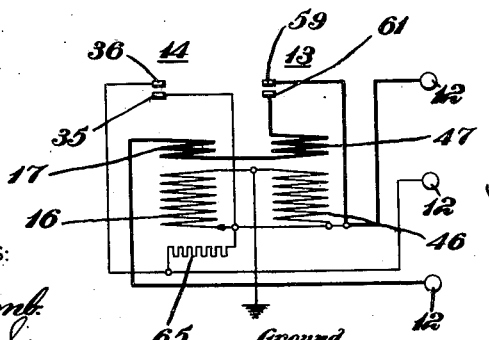
Fig. 3 is a wiring diagram of the regulating unit.

From Fig. 3, it will be noted that contact members 35 and 36 are in circuit with the opposite sides of a resistor 65 (also indicated in Fig. 5) so that, whenever the armature 19 is actuated, a shunt circuit for the resistor 65 is completed, the effective value thereof being controlled by the vibratory action of the contact members. It will also be noted that the contact members 59 and 61 are connected in series relation with the windings 47 and 17 which are in series-circuit relation with the load. Accordingly, whenever the contact members 59 and 61 are actuated, a circuit is completed which prevents the improper discharge of the storage battery.

The shunt energizing coils 46 and 16 are illustrated as parallel connected. There will, of course, be no invention in connecting these coils in series relation and it is sometimes desirable to do so.

Modifications in the system and in the arrangement and location of parts may be made within the spirit and scope of my invention, and such modifications are intended to be covered by the appended claims.

I claim as my invention:—

1. A regulator comprising a base having a yoke secured thereto, an electromagnet within said yoke and comprising an energizing coil, a series compensating coil, a magnetizable core associated with said coils and an armature co-operating with said core, a flexible hinge for said armature secured to the yoke, a stud mounted within said armature and adapted to engage said core, a spring engaging said stud, an adjustable tension screw therefor, a U-shaped bimetallic support for said screw and also constituting a fulcrum for said spring, a contact member carried by said armature, a second contact member co-operating therewith and adjustable supporting means for said second contact member also secured to said yoke.

2. In a regulator, the combination with a base having a yoke secured thereto and an electromagnet comprising an energizing coil, a series-compensating coil and an armature co-operating therewith, of a flexible hinge for said armature secured to the yoke, a spring engaging said armature, an adjustable tension screw therefor, a bimetallic support for said screw, a contact member carried by said armature, a second contact member co-operating therewith and adjustable supporting means for said second contact member secured to said yoke.

3. In a regulator, the combination with an electromagnet comprising an energizing coil, a series compensating coil and an armature co-operating therewith, of a flexible hinge for said armature, an adjustable tension spring for said armature, a bimetallic means adapted to independently adjust the tension of said spring and a pair of contact members co-operating with said armature.

4. In a regulator, a yoke, an electromagnet comprising a plurality of coils and a movable armature actuated by said coils, a tension spring associated with said armature, adjusting means therefor, a temperature-compensation element supporting said adjusting means, a contact member carried by said armature, a second contact member co-operating therewith and supporting means for said second contact member.

5. In an electric-regulator system, the combination with a regulator comprising a yoke, an electromagnet mounted within said yoke and having an energizing coil, a magnetizable core associated with said coil, a movable armature associated with said core, a tension spring secured to said armature, and an adjusting screw for said spring, of a bimetallic support for said screw adapted to vary the tension upon the spring in accordance with the temperature variations of said regulator.

6. In an electric-regulator system, the combination with a regulator comprising an electromagnet having a shunt coil, a series coil, a movable armature associated with said coils, tension means associated with said armature and adjusting means therefor, of a bimetallic carrier for said adjusting means adapted to vary said tension means in accordance with temperature variations in said regulator.

7. In a regulator system, the combination with a resistor, of a regulator for controlling the effective value of said resistor comprising an electromagnet having a magnetizable core, an armature associated therewith, an energizing coil, and a compensating coil positioned upon said core so that the magnetic flux thereof is concentrated adjacent to said armature.

In testimony whereof, I have hereunto subscribed my name this 25th day of August, 1921.

WARREN P. LOUDON.